(12) United States Patent
Bull et al.

(10) Patent No.: US 7,877,994 B2
(45) Date of Patent: Feb. 1, 2011

(54) WAVE ENERGY CONVERTER (WEC) WITH HEAVE PLATES

(75) Inventors: Diana Bull, Philadelphia, PA (US); James Gerber, St. Paul, MN (US); William Powers, Exton, PA (US)

(73) Assignee: Ocean Power Technologies, Inc., Pennington, NJ (US)

( * ) Notice: Subject to any disclaimer, the term of this patent is extended or adjusted under 35 U.S.C. 154(b) by 899 days.

(21) Appl. No.: 11/796,852

(22) Filed: Apr. 30, 2007

(65) Prior Publication Data
US 2007/0266704 A1 Nov. 22, 2007

Related U.S. Application Data

(60) Provisional application No. 60/796,388, filed on May 1, 2006.

(51) Int. Cl.
*F03C 1/00* (2006.01)
(52) U.S. Cl. .............................. 60/495; 60/497; 60/498; 60/499
(58) Field of Classification Search ........... 60/495–497, 60/498, 499
See application file for complete search history.

(56) References Cited

U.S. PATENT DOCUMENTS

| 3,546,473 | A | * | 12/1970 | Rich | ........................... | 290/42 |
| 4,260,901 | A | * | 4/1981 | Woodbridge | ................. | 290/42 |
| 4,606,673 | A | * | 8/1986 | Daniell | ....................... | 405/210 |
| 5,324,988 | A | * | 6/1994 | Newman | ...................... | 290/54 |
| 7,168,532 | B2 | * | 1/2007 | Stewart et al. | ............... | 188/161 |
| 7,310,944 | B2 | * | 12/2007 | Sabol et al. | ................... | 60/495 |
| 2004/0163389 | A1 | * | 8/2004 | Gerber et al. | ................. | 60/595 |
| 2005/0237775 | A1 | * | 10/2005 | Sabol et al. | .................. | 363/178 |

* cited by examiner

*Primary Examiner*—Hoang M Nguyen
(74) *Attorney, Agent, or Firm*—Henry I. Schanzer, Esq

(57) ABSTRACT

The stability and power conversion efficiency of a wave energy converter (WEC) which includes a float, a spar and a power taken device (PTO) connected between the spar and the float is increased by connecting a heave plate to the spar in a very secure manner and by carefully limiting the movement between the float and spar to one direction (i.e., up-down motion). Buoyancy chambers may be attached to the WEC to facilitate its transportation and deployment. The WEC may be formed in sections and assembled at, or close to, the point of deployment.

32 Claims, 16 Drawing Sheets

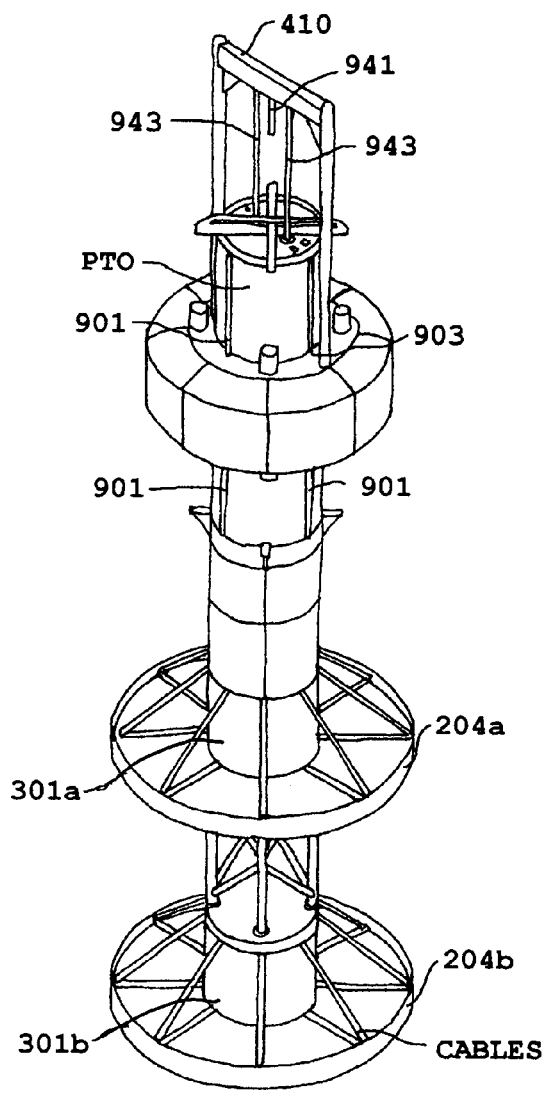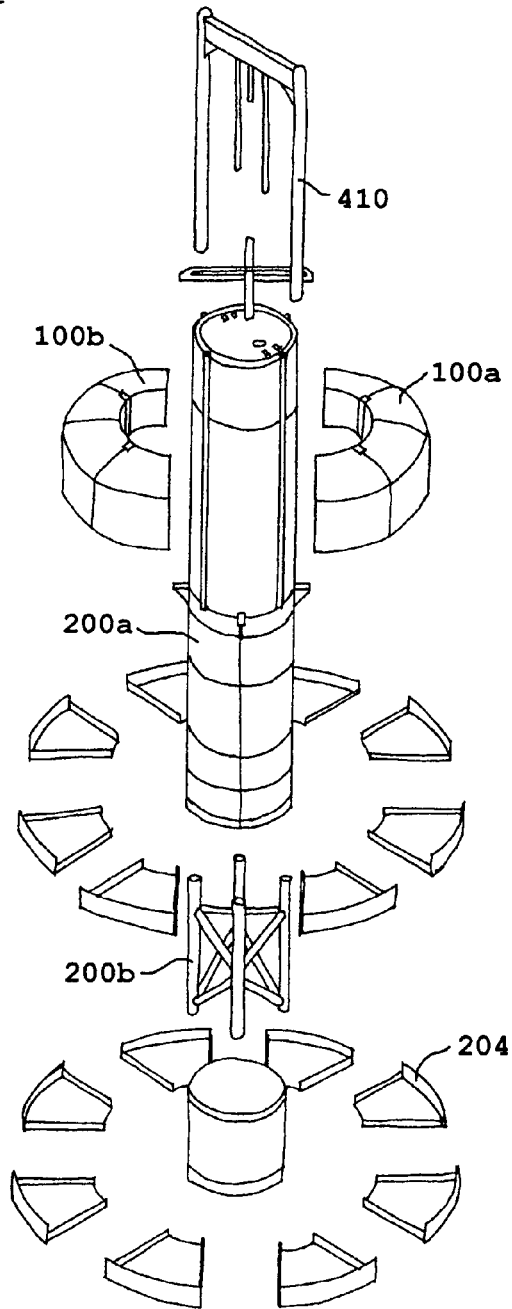
FIG. 3
FIG. 3A

WAVE ENERGY CONVERTER (WEC) WITH HEAVE PLATES

This invention claims priority from provisional application Ser. No. 60/796,388 filed May 1, 2006 for Wave Energy Converter (WEC) with Heave Plates whose contents are incorporated herein by reference.

BACKGROUND OF THE INVENTION

This invention relates to a wave energy converter (WEC) buoy having a horizontal float (hereafter "float") and a vertical generally cylindrical float (hereafter "spar") which, when placed in a body of water, can move relative to each other in response to the motion of the waves. The WEC includes a power take off device (PTO) responsive to the relative motion between the spar and the float for producing suitable forms of energy, mechanical and/or electrical.

Numerous problems exist in the manufacture of a useful WEC system which can operate reliably under the hostile conditions present in the ocean. The large variations in the amplitude, frequency and direction of the forces of the waves make it difficult to maintain the stability of a WEC and to operate it efficiently and reliably. Other problems relate to the transportation and deployment of a WEC, which tends to be bulky and heavy. WECs embodying the invention include means for resolving these and other problems pertaining to the manufacture and efficient operation of the WECs.

SUMMARY OF THE INVENTION

A WEC buoy embodying the invention includes a float and an elongated spar. One of the float and spar is designed to move generally in phase with the waves while the other one of the float and spar is designed to move generally out of phase with the waves. A PTO connected between the float and the spar is designed to convert their relative motion into electrical energy, or any other form of useful energy. Typically, the float is designed to move in phase and the spar out of phase with the waves.

The invention is applicable for use in and with wave energy converters (WECs) which include a float and a spar which, when placed in a body of water, can move relative to each other in response to the motion of the waves. The WEC may be of the type described and claimed in U.S. Pat. No. 7,140, 180 assigned to the assignee of the present application and whose teachings are incorporated herein by reference. Although it should be understood that the invention is applicable to any apparatus having a spar to which a heave plate is attached to control the movement of the spar. This application also incorporates the teachings, as though fully set forth herein, of a patent application Ser. No. 11/796,851 titled Heave Plate With Improved Characteristics being filed simultaneously with this application and assigned to the same assignee.

One aspect of the invention includes the design of a spar whose effective "mass" and "spring constant" can be increased and or decreased in a cost effective manner to optimize the relative motion between the float and the spar in response to the waves of the body of water in which the WEC is placed. In accordance with the invention, one, or more, "heave" plates is/are centrally attached to the spar, below the water line, generally perpendicular to the vertical orientation of the spar. Rods, and/or cables, and/or beams, and/or pipes, are connected between the outer periphery of, and/or selected points along, the heave plate and the spar to ensure that the heave plate moves up and down with the spar, reducing problems due to cantilevering and/or twisting. The "heave" plates have two effects on the characteristics of the spar in vertical motion. One effect is to provide drag which impedes relative motion between the spar and the surrounding water column. The other effect is to cause a volume of water to be entrained above and below the heave plate which, in effect, adds extra mass to the spar. These two effects result in very different dynamic behaviors, and the interplay between them can be used to give the central spar desired characteristics.

The addition of added mass to the spar benefits the power conversion characteristics of the WEC because it increases the inertia of the spar and helps to lower its natural frequency. Thus the central spar is made to have a natural resonance frequency (NRF) which is lower than that of the waves or the float by using heave plates, resulting in improved power conversion. In addition, the restorative buoyancy of the spar affects the resonant frequency. Decreasing the restorative buoyancy lowers the natural frequency of the spar, where restorative buoyancy may be defined as the hydrostatic force which arises in response to displacements in heave of a floating structure, and which tends to restore the floating structure to its natural draft. The drag effect due to the heave plate can help or hurt, depending on several factors, primarily the ratio between the depth of the heave plate in the water column and the wavelength of the predominant surface waves.

The heave-plates of the present invention can be considered a cost effective solution for increasing the effective mass of the spar.

An embodiment of the present invention includes attaching a heave plate with "lipped" or vertical structures to the spar. Lipped, or vertical, structures may be formed along the upper and lower surfaces of the heave plates. There are at least two benefits of these heave plates with lips. One is that it increases the effective mass of the spar. The other is that, depending on their size and shape, the lips can decrease the drag force which comes about due to relative vertical motion. Typically, the lips are formed along the periphery of the heave plate extending in a perpendicularly upward and/or downward direction to the plane of the heave plate. The size and extent of the lips may provide different desired results.

WECs embodying the invention include a guidance/bearing system coupling the float and spar such that their relative motion is generally limited to movement along one direction (i.e., up and down when deployed) despite rotational and racking forces and thrusts in different lateral directions.

In selected embodiments, the cross section of the upper portion of the spar, in the region where the spar moves up and down perpendicularly to the water line and the float, may be decreased to decrease its buoyancy or "springiness". Decreasing the restorative buoyancy of the spar decreases (lowers) the natural frequency of the spar.

A WEC system embodying the invention includes buoyancy chambers and ballasting apparatus to orient the spar and float and to ease the deployment and retrieval of the WEC buoy and also includes apparatus to ensure its survival in significant storm conditions.

Since the float and the spar can both move (i.e., neither the spar nor the float is fixedly anchored to the sea bottom) a mooring system is designed to hold the WEC buoy within a prescribed area.

A WEC system embodying the invention include apparatus to enable operation of the WEC over large tidal ranges.

The WEC buoy has three major elements a float 100, a spar 200, and a power conversion system 300, as shown in several of the Figures. The spar component includes a vertically oriented, cylindrical element which provides a stable platform to support and give reaction force to the power take-off system. The spar is shown to be a cylindrical element; however that need not be the case and the spar may be part of a truss system.

In one embodiment, the spar has an upper portion used to provide buoyancy and housing for all PTO and power conversion equipment. The lower portion of the spar includes a ballast compartments and heave plates. The length and mass of the spar, and the heave plates provide inertia and stability giving the spar limited motion response in normal, predominant wave periods.

The PTO and power conversion system may include hydraulic, mechanical linkages, generators, controllers, and electrical equipment. Linear electrical generators (LEGs) may also be used to convert the mechanical energy produced between the spar and the float and convert it to electrical energy. In one embodiment all the power conversion components were designed to be completely housed inside the spar. The linear motion caused by the float movement may be captured by hydraulic equipment, and converted to rotary power through fluid pumps and motors connected to power generation equipment. Alternatively, the power conversion system may be located in the lower portion of the spar and/or along and/or in the float. Where the PTO includes a linear electric generator (LEG) the PTO may be distributed between the float and spar. The power conversion system may be housed in the spar, as shown, or in the float and/or may be distributed between the float and spar.

In WEC systems embodying the invention, the WEC may be designed to have a power cable attached to the spar and/or float above the water line to eliminate the need to have an underwater cable connection.

BRIEF DESCRIPTION OF THE DRAWINGS

In the accompanying drawings, which are generally not drawn to scale, like reference characters denote like components.

FIGS. 2 and 3 are isometric views of WECs embodying the invention showing the spar and float in greater detail and different connections of the heave plates to the spar;

FIG. 3A is a diagram illustrating the sectioning of a WEC;

DETAILED DESCRIPTION OF THE FIGURES

FIGS. 1 through 8 depict WECs with at least one "heave" plate centrally connected to the spar, below the water line. The heave plate, as used herein, refers to a plate extending in a generally perpendicularly direction to the spar. In the figures the heave plate is shown to be circular. However it should be understood that the plate could be triangular, or a square or any polygon, so long as the spar is centrally located about the surface of the plate. As already noted, the heave plate provides drag (resistance) and added mass (inertia) characteristics important in the operation of the WEC. Hence, while the float is designed to respond to the higher frequency motion of the waves, the heave plate gives the spar characteristics to respond to much lower frequency (longer period) wave motions and thus increase the differential in the relative motion between the spar and float.

Figure 1:
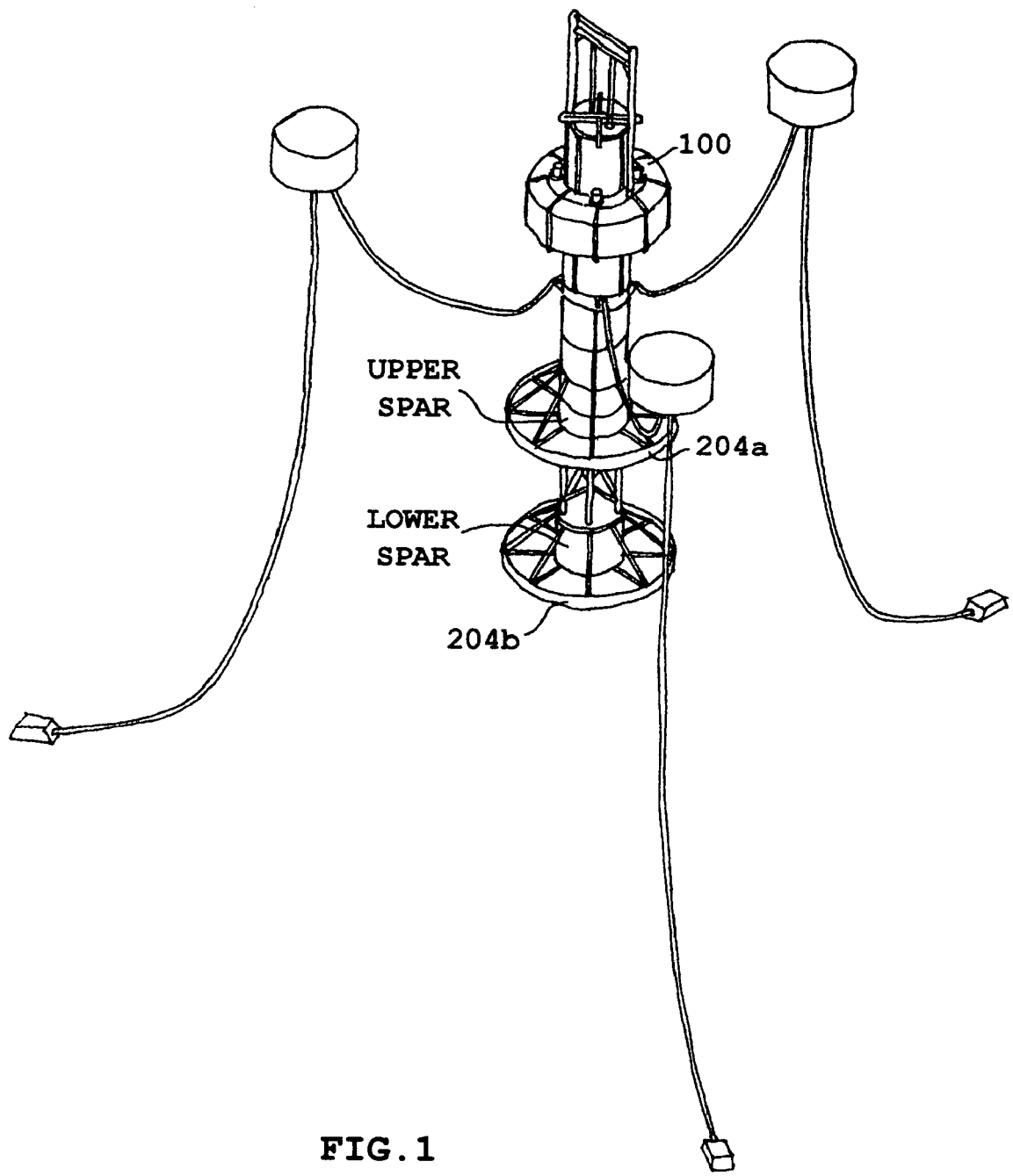
FIG. 1 is an isometric drawing showing a WEC buoy system embodying the invention which includes a float and a spar to which two heave plates are connected and a 3 point mooring arrangement.
Figure 2:
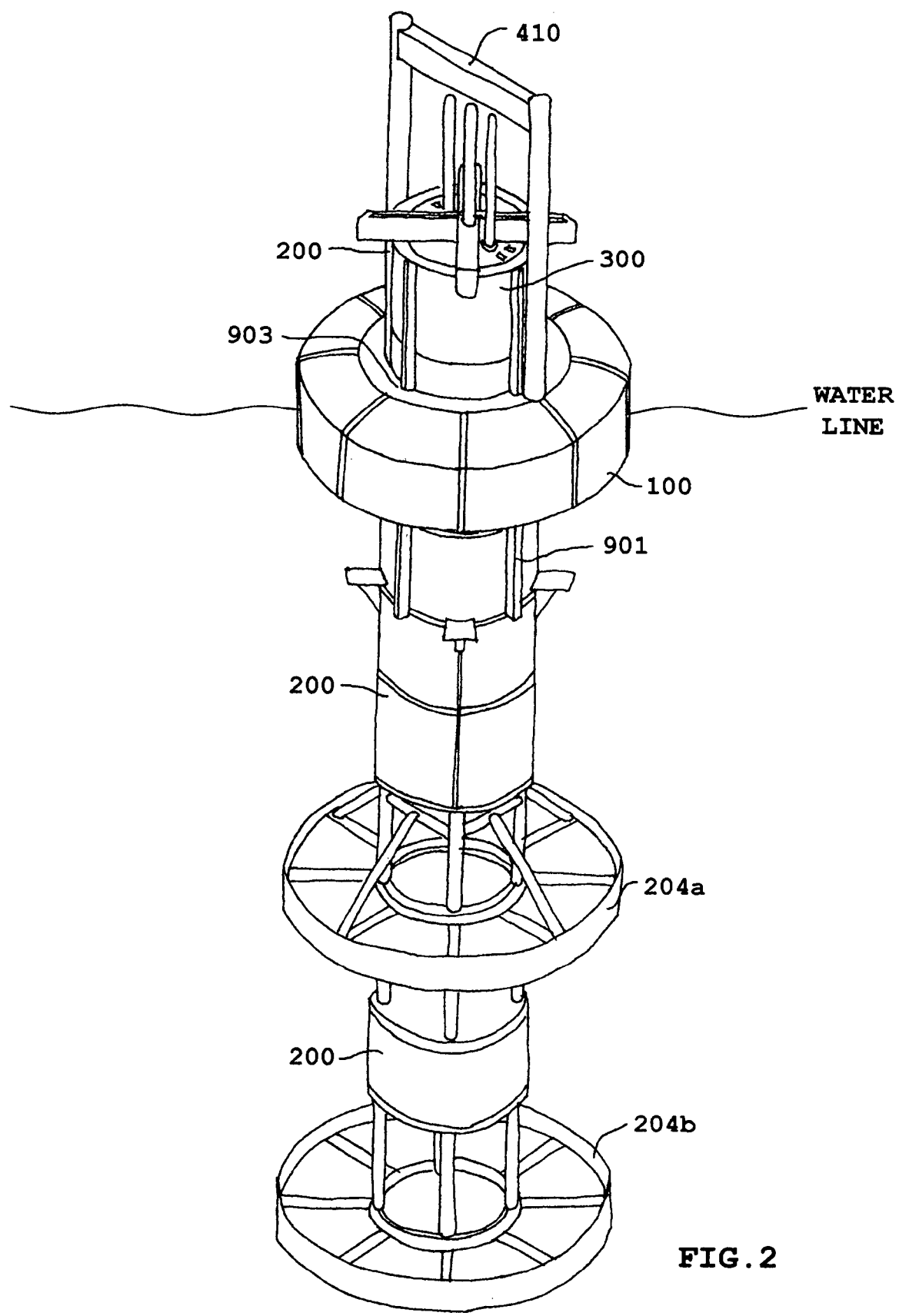

In FIGS. 1, 2 and 3, there is a heave plate 204a mounted and attached to the mid region of the spar and a heave plate 204b mounted and attached to the lower or bottom portion of the spar. These figures also illustrate that the heave plates may be connected by rods descending from the spar or by cables, beams, pipes and/or rods extending from the outer periphery of the heave plate to the spar to maintain the plate stable and generally perpendicular to the spar. The differences in the structures shown in the various figures illustrate that there may be different structural configurations for securing a heave plate and for stabilizing the float and spar. As shown in some of the figures, the securing and supporting members interconnecting the heave plate and the spar are rigid elements and are they are rigidly attached by means of bolting or welding. As shown in other figures, the heave plate and spar are interconnected via pretensioned rods and/or cables to reduce weight, cost and drag. These tensioned and pretensioned elements are configured to keep the heave plate structure in a tension mode to counteract the numerous different forces applied to the system from diverse different directions.

The heave plate is shown to be symmetrically disposed and to be rigidly and fixedly connected to the spar to provide a like response when the spar is being raised as when it is being lowered. However, the heave plate may be designed to provide a different response when being lifted (raised) as compared to when it is being driven down (lowered) by shaping the surface of the plate and even by controlling the effective area of the plate when going up or down. For example, in a floating system that comes close to the sea floor in storm conditions, the heave plate may be curved concavely (like a contact lens) such that the rim is pointing towards the ocean floor so that as the floating body moves towards the sea floor the drag and added mass is greater hence helping to impede the motion. Added-mass may be provided to be independent of direction of motion. However, it is possible to construct a heave plate which has different added mass characteristics dependent on direction. for example, a flap or one-way valve may be included as part of the heave plate design which allows water to flow through the heave plate in one direction but not the other.

Any portion of the WEC can be built out of steel painted to retard marine growth and corrosion. However, portions of the WEC can also be made out of alternative materials to reduce cost or weight and reduce maintenance needs. For instance, the heave plates may be fabricated out of fiberglass if their weight is a concern. It is also possible to fabricate portions of the float or spar out of marine concrete to reduce the cost of material, although this will cause the weights of the components to increase.

FIG. 3 shows the presence of buoyancy/ballast tanks 301a, 301b located above heave plates 204a, 204b, respectively. The buoyancy tanks are used to control the flotation of the system when the WEC is deployed. These buoyancy tanks may also be used to ease the transportation and deployment of the WEC as discussed below. Note that the buoyancy tank may be made a part of the heave plate, or as part of the lips above and below the heave plate or the buoyancy tanks could be separate structures above or below the heave plate. WEC systems embodying the invention may include adjustable buoyancy tanks as part of the float, the spar and the heave plate to adjust performance, compensate for marine growth and ease deployment and retrieval of the buoy/WEC.

FIG. 3A illustrates that the WEC can be formed as different sections which can be transported separately and then assembled on site or close to the deployment site. Thus, WEC systems embodying the invention may be manufactured in sections to facilitate the deployment, attachment and/or detachment of the WEC for maintenance and/or repair.

Figure 4:
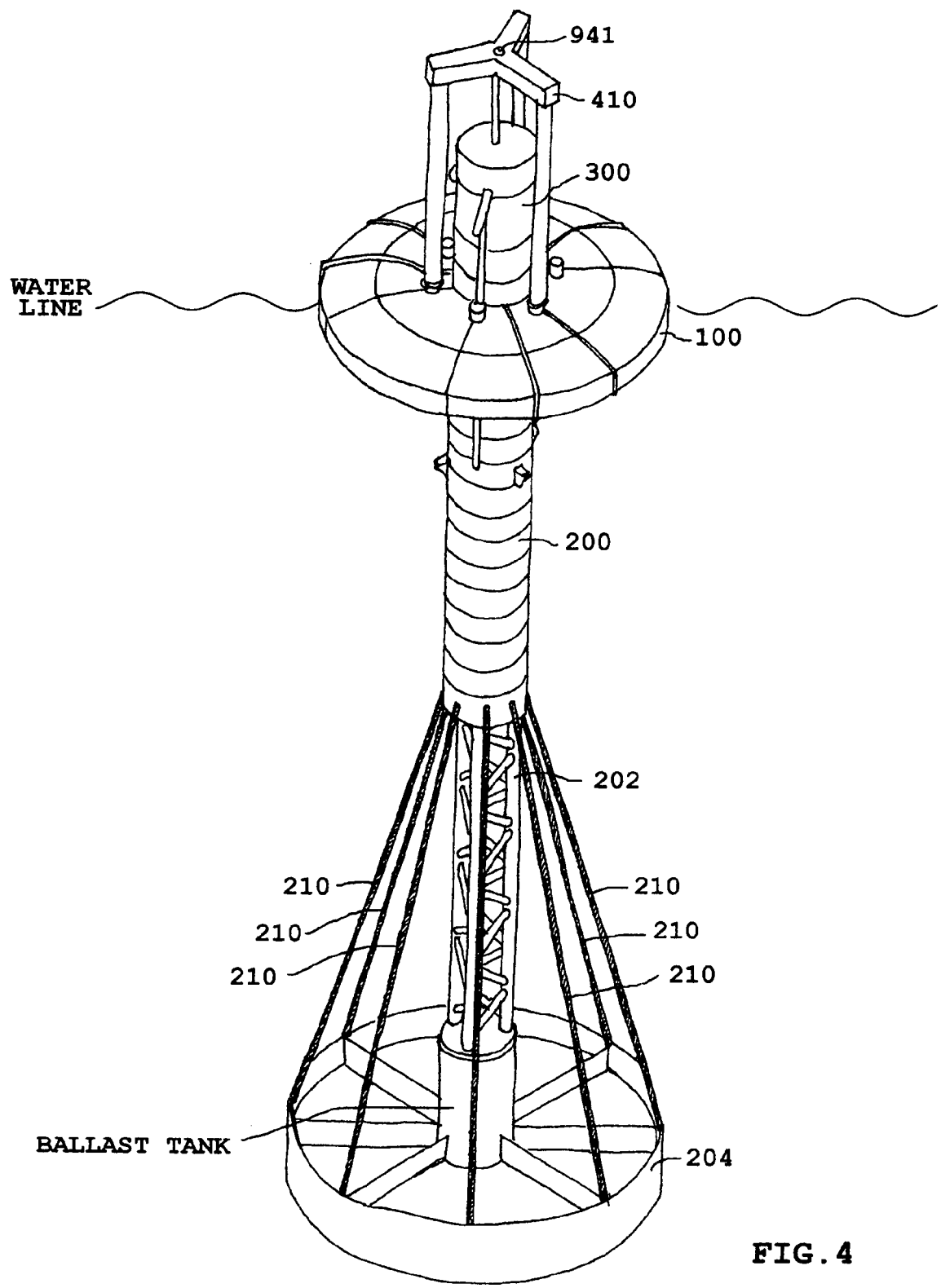
FIG. 4 is an isometric view of a WEC with a single heave plate, with raised edges (lips), connected to the spar.

FIG. 4 shows a spar 200 including a downwardly extending truss structure 202 with a single heave plate 204 mounted on the bottom end of the truss structure 202. The heave plate 204 includes an upper lip 206a and a lower lip 206b (as shown more explicitly in FIGS. 6 and 6A). The heave plate and lip combination functions to increase the effective mass of the spar to which the heave plate is connected. In FIG. 4, the outer edge of the circular heave plate is shown connected by cables (or rods) 210 to the lower portion of the spar, above the truss 202. The truss structure 202 is shown to be an open truss section to reduce the effects of horizontal currents pushing against the spar.

Figure 5C:
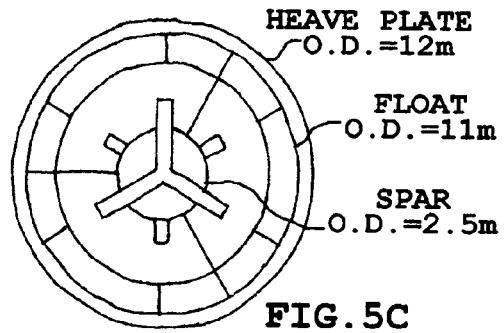
FIGS. 5A, 5B and 5C are different views of a WEC with a heave plate connected to the lower portion of the spar.
Figure 5A:
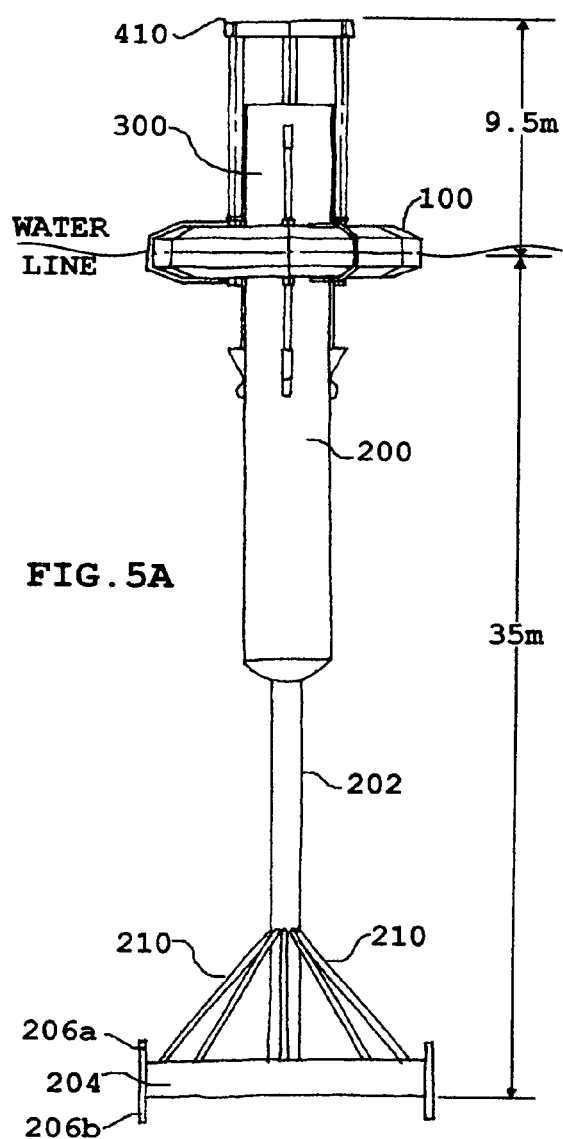
Figure 5B:
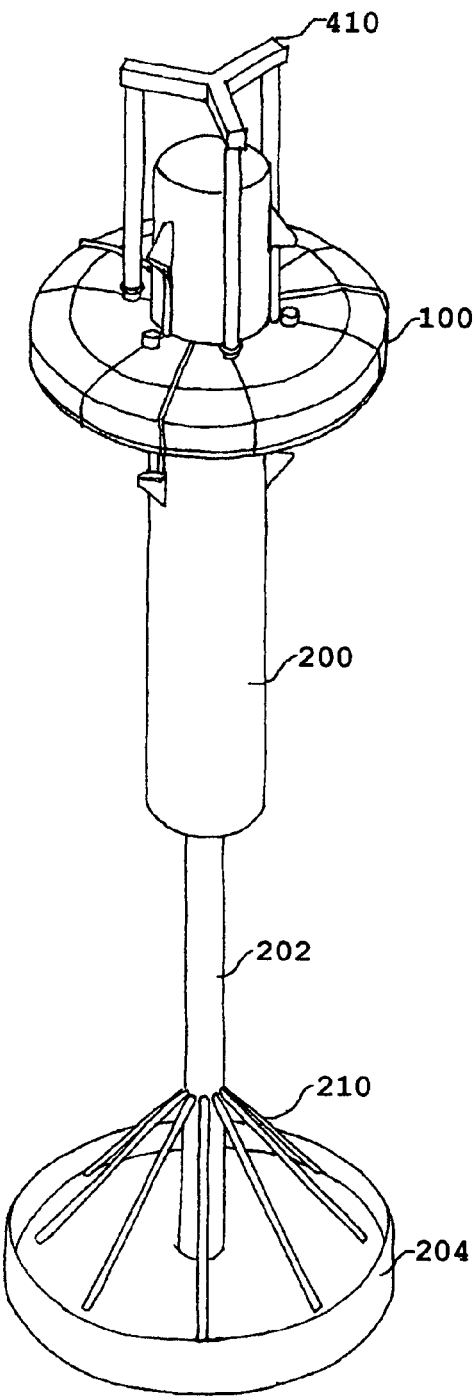

FIGS. 5A, 5B and 5C show a WEC design where the heave plate is secured via rods/cables/struts/pipes/beams 210 to the lower portion of the strut 202. In this embodiment (see FIGS. 5A, 5B and 5C) the length of the spar 200 and the strut 202 connecting the spar to the heave plate exceeded 35 meters. The outer diameter of the spar was 2.5 meters, and it protruded above the water line by 5-6 meters. The upper truss 410, for coupling the movement of the float to the PTO 300 located in the upper portion of the spar, had a height of 9.5 meters above the water line. The outer diameter of the float was 11 meters and the outer diameter of the heave plate was 12 meters. Thus, in this embodiment, the outer diameter of the heave plate was made greater than the outer diameter of the float.

There are preferred relationships between the NRF (natural resonant frequency) of the float and the NRF of the spar. There are in addition preferred relationships between the total volume (displaced volume+added volume) of the float and the total volume of the spar. To understand why this is so, consider a float and spar with a preferred relationship of NRFs but with grossly incommensurate total volumes. Suppose that the total volume of the float is, e.g. 100 tons, but the total volume of the spar is only 1 ton. In this example, there will be a highly consequential impedance mismatch, which would lead to very inefficient power capture. A preferred ratio for a typical wave climate between the total volume of the float, and the total volume of the spar, is approximately 4:1. The ratio between float and spar total volume for a given wave climate may be determined by modeling power conversion characteristics for several ratios, and choosing the optimal ratio. The increase in the size of a heave-plate, or the addition of an extra heave-plate, may be preferred methods for the designer to increase the spar total volume.

In another embodiment the spar was designed to have a draft of approximately 10 meters or more, and a diameter of 1 m. The top of the spar was designed to protrude above the surface of the water by approximately 2.5 meters. The float element was a toroidal float designed to move linearly up and down relative to the spar, in response to rising and falling wave action. The float supports a truss (also referred to as a bridge), element 410 in the figures, that is connected to the power conversion system through the top of the spar, and its relative motion against the spar provides the driving force into the power conversion system. In this embodiment the float 100 was designed to have an outer diameter of approximately 3.25-3.5 meters, with a draft of approximately 1 meter and the truss had an overall height of roughly 4.25 meters above the water.

Figure 6:
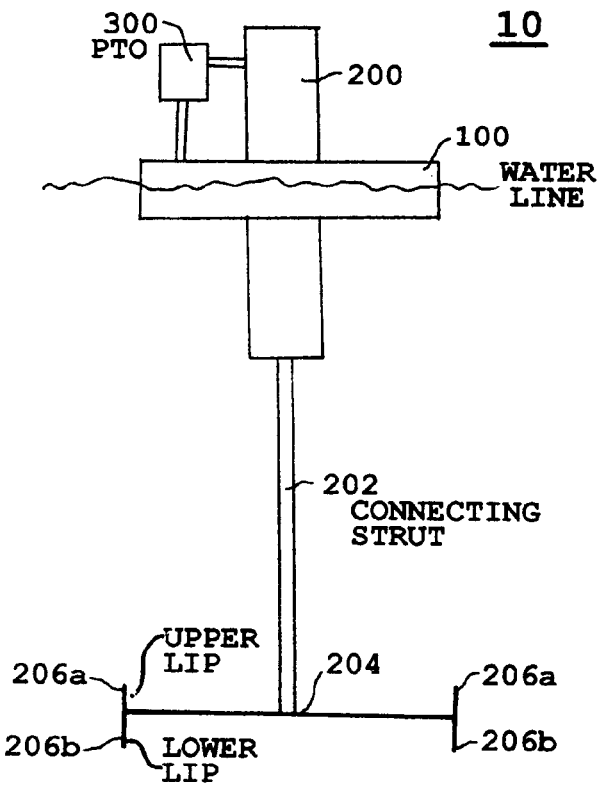
FIGS. 6 and 6A are cross-sectional idealized diagrams showing the heave plate connected to the spar and a power take off device (PTO) connected between the float and the spar.

FIG. 6 illustrates that the WEC 10 includes a heave plate 204 which is formed with an upper lip 206a and a lower lip 206b as discussed above. In FIG. 6 the PTO 300 is shown connected between the spar and the float to convert their relative motion to useful energy. This shows that the PTO need not be within the spar. The PTO can be contained or mounted at any convenient point where it can be coupled to components/members driven by the spar and float to respond to their relative motion.

Figure 6A:
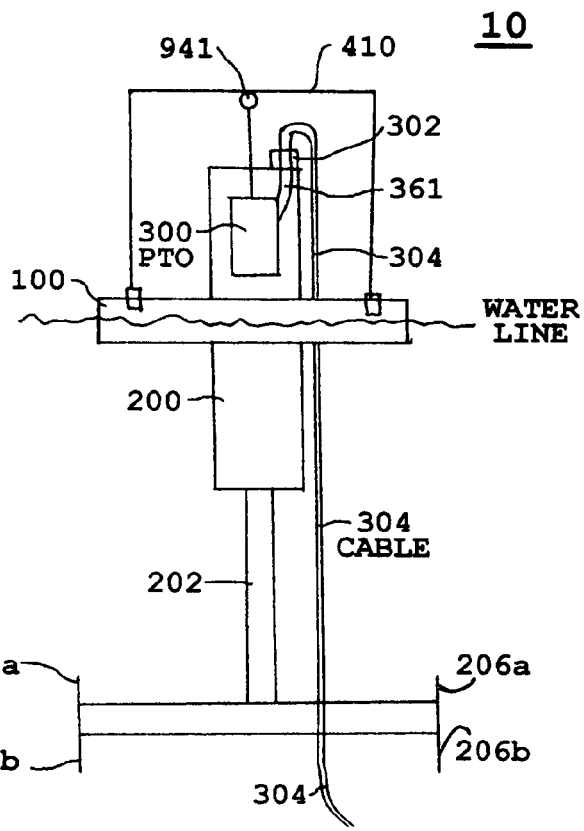

FIG. 6A illustrates that, as in FIGS. 2, 3, 4, 5 and 14 the PTO 300 may be located in the upper portion of the spar 200. A truss or bridge 410 is mounted above the float (and spar) and translates the movement of the float to drive the PTO. The mechanical structure, such as truss 410, coupling and translating the movement of the float to the PTO includes a flexible coupling (swivel joint 941) such that misalignment between the float and spar is compensated through the flexible coupling.

A cable 361 is connected between selected input/output ports of the PTO and a connector 302 which is shown mounted above the water line to the top portion of the spar. This connection enables the accessing of the PTO. A cable/conduit 304 is connected to connector 302 to couple the output of the PTO to points external to the WEC. Note that the cable and the connector connection may also be used to carry signals/power between the PTO/WEC and points external to the WEC. Providing a power connection above the water line eliminates the need to have an underwater connection between the WEC's electrical system and devices external to the WEC. This results in an improved WEC with power extracted from the top portion of the buoy (above the water line) and which avoids having to make an underwater connection. A submarine rated power cable transmits power and communications back to shore via a route to a sub-sea pod (node). The cable exits the spar with bend relief features to prevent kinking and fatigue.

The use of a submerged heave plate on a WEC presents a challenge to/in the structural design. The shape of the heave plate form is essentially a large radius cantilevered platter (if the spar is centrally located), with a very large mass spread over its entire area, resulting in a very large moment at the attachment point to the spar and which will translate through the lower spar up to the upper spar. Some solutions to the problem have been shown and discussed above. Additional solutions are shown in FIGS. 7 and 8.

Figure 7:
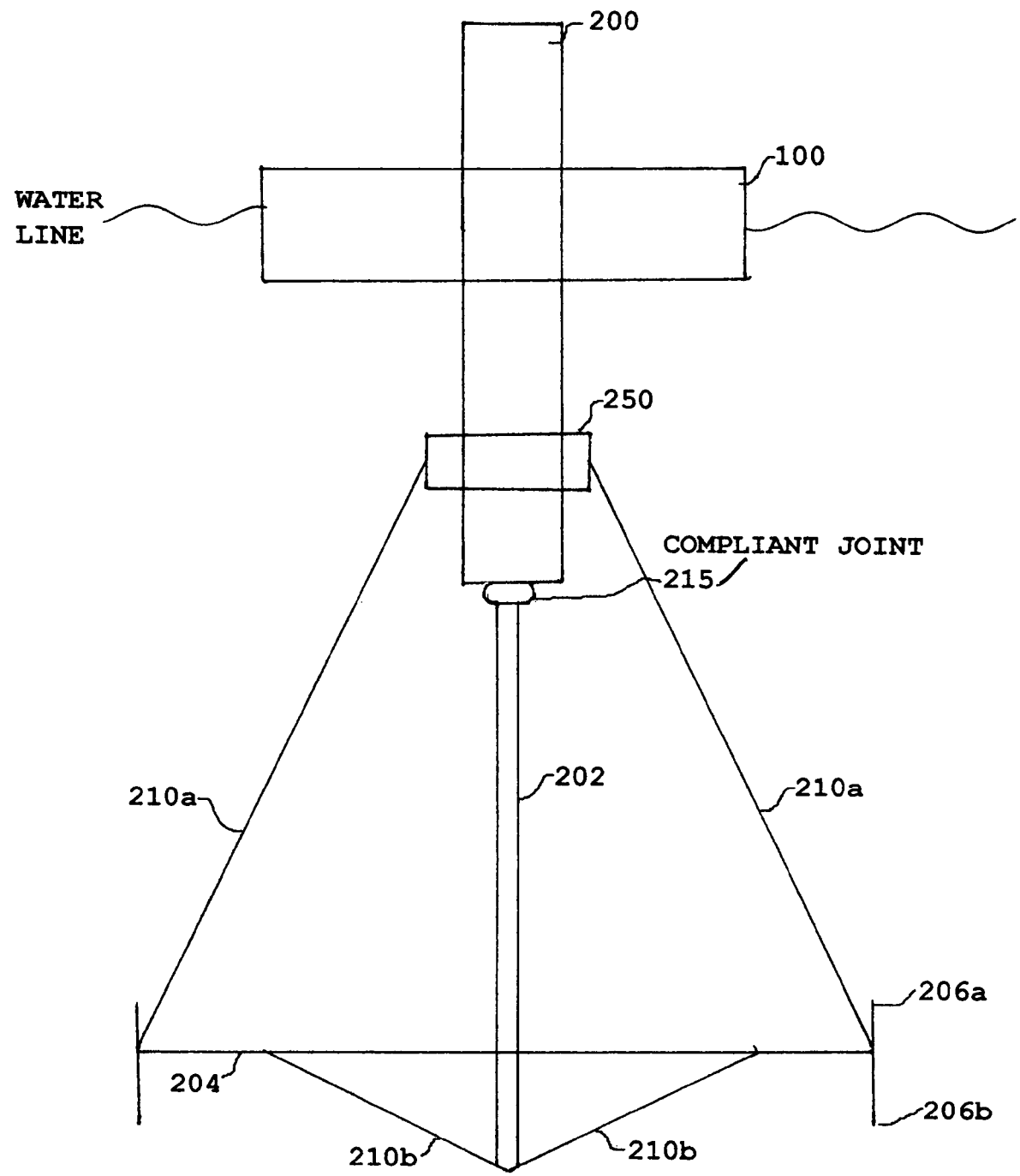
FIGS. 7 and 8 are cross-sectional diagrams showing a heave plate with lips and cables connecting the heave plate to the upper portion of a spar, below the float.
Figure 8:
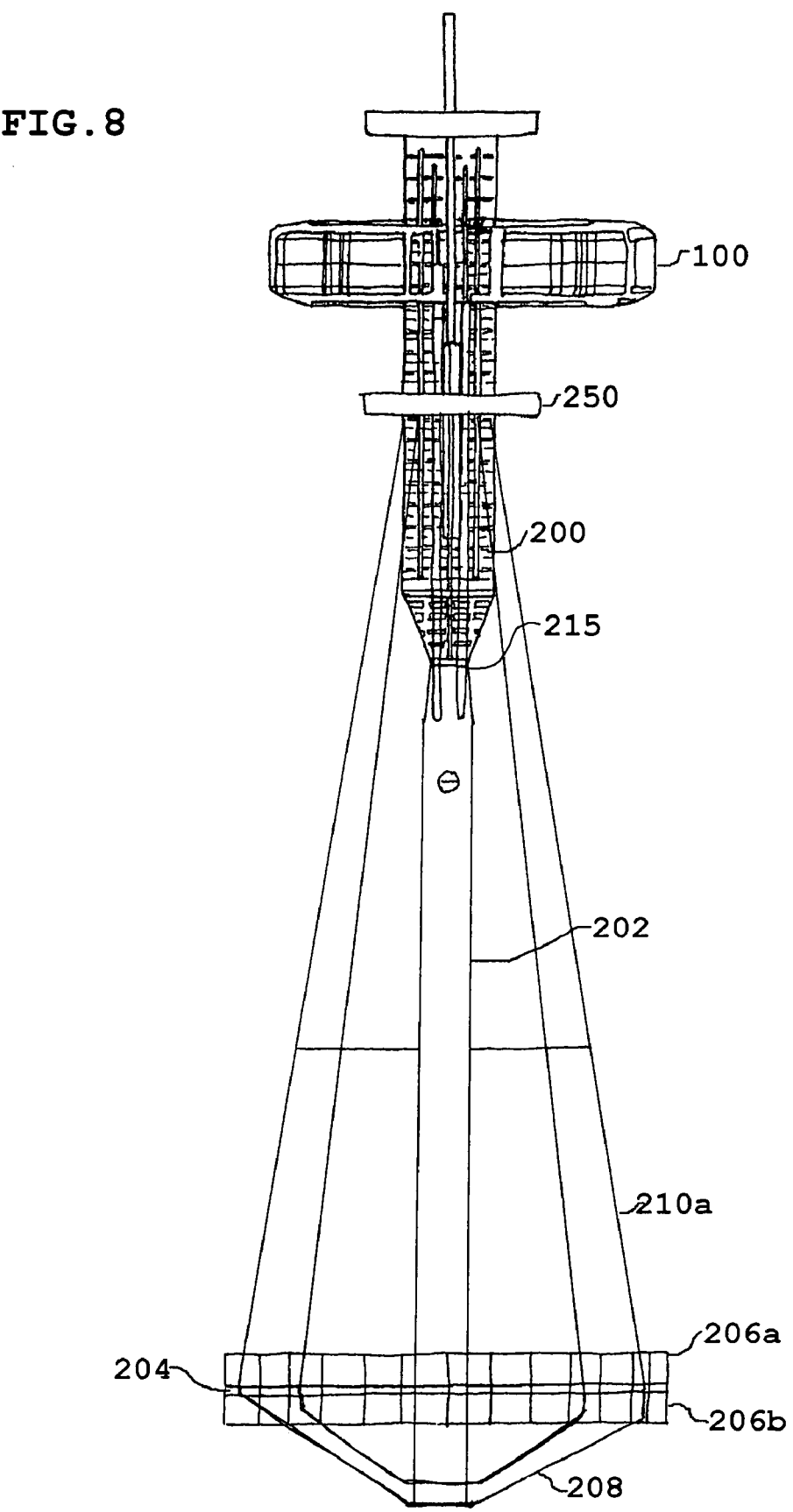

FIGS. 7 and 8 show that the spar may be considered as comprising of an upper portion, 200, and lower portion, strut 202. The two portions of the spar are interconnected via a compliant/flexible joint 215 to reduce the stress at the joining point. The bottom region of strut 202 is connected to a heave plate. A collar 250 is fixedly connected to a lower region of the upper portion of the spar above the flexible joint (the collar may be generally be at any point below the water line). Cable/rods 210 extend from collar 250 to the periphery of the heave plate to secure and stabilize the plate. Spar extension strut 202 extends below the heave plate with cables/rods 210 b connected between the lower end of the strut and the underside of the heave plate to also secure and stabilize the plate.

A series of rods, cables, beams, or pipes shown in FIG. 8 can be used to support the heave plate in a triangulated configuration to counteract the large force and moment in either direction, up or down. The rods, cables, beams or pipes (210, 210a) can be attached to the heave plate 204 at the most structurally effective (lateral) distance from the lower spar attachment point. This point may be an inner point other than the outer edge of the heave plate.

FIG. 8 illustrates that tensioned cables, or rods, 210 may extend from the collar 250 attached to the spar, above a compliant/flexible joint 215, to the top surface of the heave plate. A structure 208 below the heave plate supports the heave plate and counteracts tension from the tensioned element 210, 210a. The flexible or compliant joint 215 connecting the upper and lower sections of the spar will absorb any forces without producing a bending moment at the connection point between the upper portion of the spar, 200, and the extension strut 202. The tensioned cable design with the lower supporting struts places the extension strut 202 in compression. Structural members 208 underneath the heave plate are attached to the lower part of the spar, below the heave plate, and to the optimal location(s) on the heave plate; these members 208 supply a counter tension to members 210. This results in a cost effective structure that can support the movement of the added mass in the vertical direction.

Using a heave plate on a WEC results in increased power conversion efficiency for the WEC. For a model WEC with a centrally oriented cylindrical spar of, for example, a diameter of 1.75 m and draft of 25 m the heave natural resonance period of the spar is 10.5 sec. Hence, if an 11 sec wave is run past the spar that does not have a heave plate or a heave plate with "lips", the spar will respond to this wave practically in phase with the wave. Hence if a float were attached to the plain spar, then both objects would be moving practically in phase with the wave and in phase with each other, hence producing little to no relative motion and hence little to no power.

In sharp contrast, if a flat, circular heave plate of diameter 10 m is added to the spar, a heave natural resonance period of 31.7 sec is achieved. In addition, if vertical lips are then added above and below the heave plate, each of height 0.8 m, then the heave natural resonance period is further increased to 34.7 sec. The larger the heave natural resonance period, the longer it will take for the object (spar, spar with heave plate, spar with heave plate with lips) to respond to the wave (hence the greater the phase lag between the object and the wave). Thus, if a float, that is designed to move practically in phase with the waves, is attached to a spar with a large heave natural resonance period the relative motion between the two can be dramatically increased. This results in a significant increase in power production by the PTO.

Figure 9:
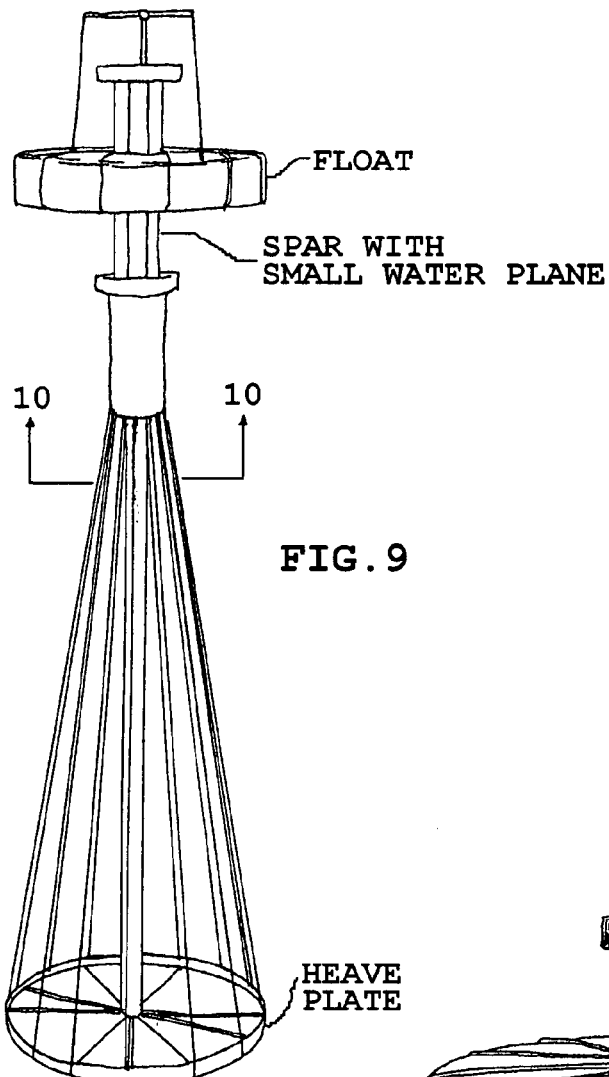
FIG. 9 is an isometric view of a WEC with the upper part of the spar formed with a reduced cross section (smaller water plane) in the region of the water line and float with the lower portion of the spar connected to a heave plate.
Figure 10:
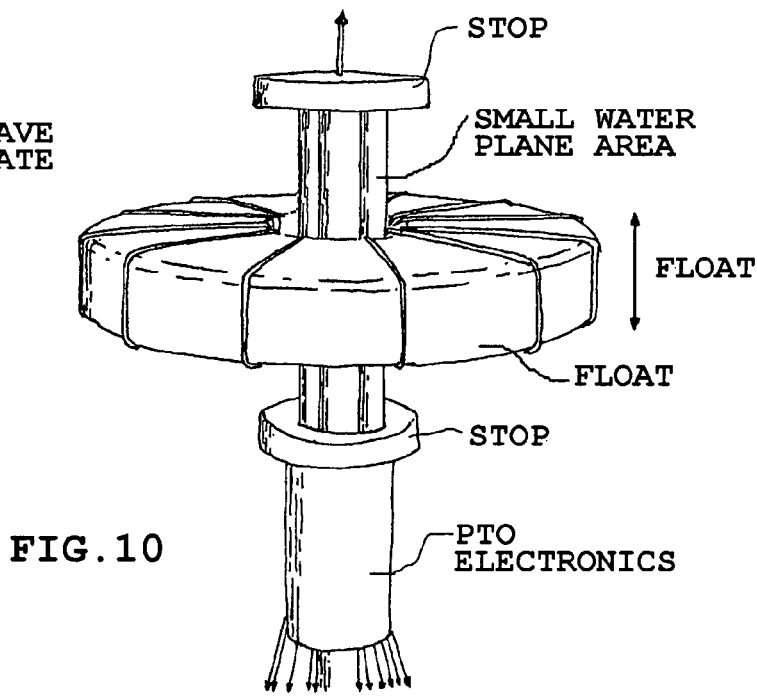
FIG. 10 is an enlarged view of the upper portion of the spar shown in FIG. 9 in the region where the float and spar pass each other in a generally out of phase relationship in response to ocean waves as they move up and down.

FIGS. 9 and 10 show a WEC with the upper portion of a spar formed with a reduced cross section (smaller water plane) in the region of the water line and the lower portion of the spar being connected to a heave plate. Reducing the cross section of the upper region of the spar in the region where the spar normally crosses the water line, when going up and down, reduces the effective buoyancy of the spar by reducing the effective "k" (spring) constant. Note that the natural period of the spar may be denoted generally as being equal to $2\pi$ times the square root of the effective mass (M) divided by the effective spring constant (K). Hence decreasing the water plane of the spar reduces the buoyancy of the spar.

There are preferred relationships between the NRF (natural resonant frequency) of the float and the NRF of the spar. Typically, it is desirable that the NRF of the float be higher in frequency than the NRF of the spar. If the NRF of the float is high in frequency relative to the spread of wave frequencies, then the float, when unencumbered with a PTO, will tend to be a wave follower. If the NRF of the spar is low in frequency, relative to the range of wave frequencies, then it will tend to move out-of-phase with the waves. Thus, the float and spar will have a natural tendency to move out of phase.

The NRF of the spar is a function of the total volume (displaced volume plus added volume) and the waterplane area. A formula for the NRF is as follows: Resonant Frequency=$1/(2*pi)*sqrt(g/z)$, where g is the acceleration due to gravity, and z is the effective depth of the structure, defined as (Total Volume)/(Waterplane Area.) As can be seen from this formula, a decrease in the waterplane area leads to a decrease in the natural resonant frequency.

The designer of a WEC may thus want to minimize the waterplane area of the spar to optimize power production characteristics. However, there are some trade-offs that the designer needs to consider. Once the NRF of the spar is much lower than the lowest wave frequency, good power conversion properties may be obtained. A further decrease in waterplane area may have negative effects on the ability of the spar to maintain itself at a desired draft in the presence of loads leading to vertical forces on the spar. Examples of such loads include vertical forces imparted by the mooring in the presence of a current, or a net downward drift force due to nonlinear wave action.

Figure 11:
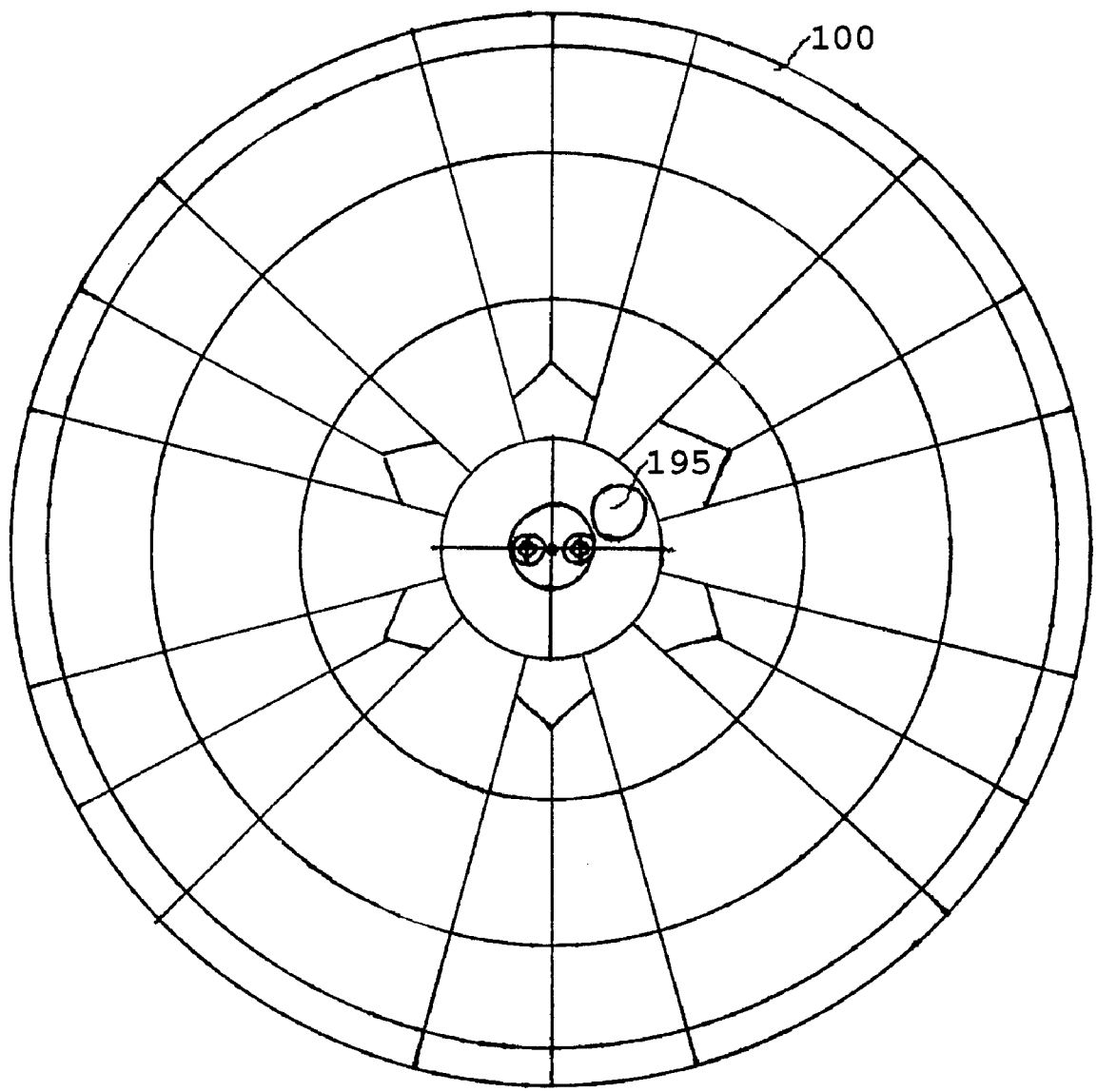
FIG. 11 is a top view of the spar and float of FIG. 9.

FIG. 11 is a top view of a float showing a man access 195 to enable accessing selected parts of the WEC for maintenance and/or repair. The figure also demonstrates that the float can be formed/fabricated in "pie" sections. Likewise, the heave plate can be formed in pie sections which can subsequently be connected together.

The spar may be held in place using a compliant, three point mooring system with auxiliary surface buoys (ASBs) or auxiliary sub surface buoys (ASSBs) as shown in FIG. 1. By way of example, in one embodiment, the ASB's were designed to have a diameter of approximately 3 to 3.5 meters. Tether lines from the ASB's connect to the spar. The compliancy of the system allows the spar to move with tidal variation, and survive heavy seas. Mooring lines may include a combination of synthetic lines, wire rope, chain and shackle components. Anchors on the sea-bed may be sized to meet calculated anchoring forces as well as local sea-bed conditions. For a hard (e.g., limestone) sea-bed condition, a combination of rock bolts and gravity base may be appropriate. The mooring lines may extend out from the spar at lengths dependent on the depth and should be lengthened for deeper water.

Float Guidance—Bearing System

The WECs shown in the figures includes a spar (or column) 200 and a float 100 (which is shown to be of toroidal shape, but may be any other suitable shape) with a central opening to permit the float to move up and down along the spar when the WEC is deployed in a body of water. A PTO 300 is connected between the spar and float to convert their relative motion into useful energy (electrical or mechanical). In some applications the motion of at least one of the float and spar is transferred via a truss/bridge 410 to the PTO.

Figure 12:
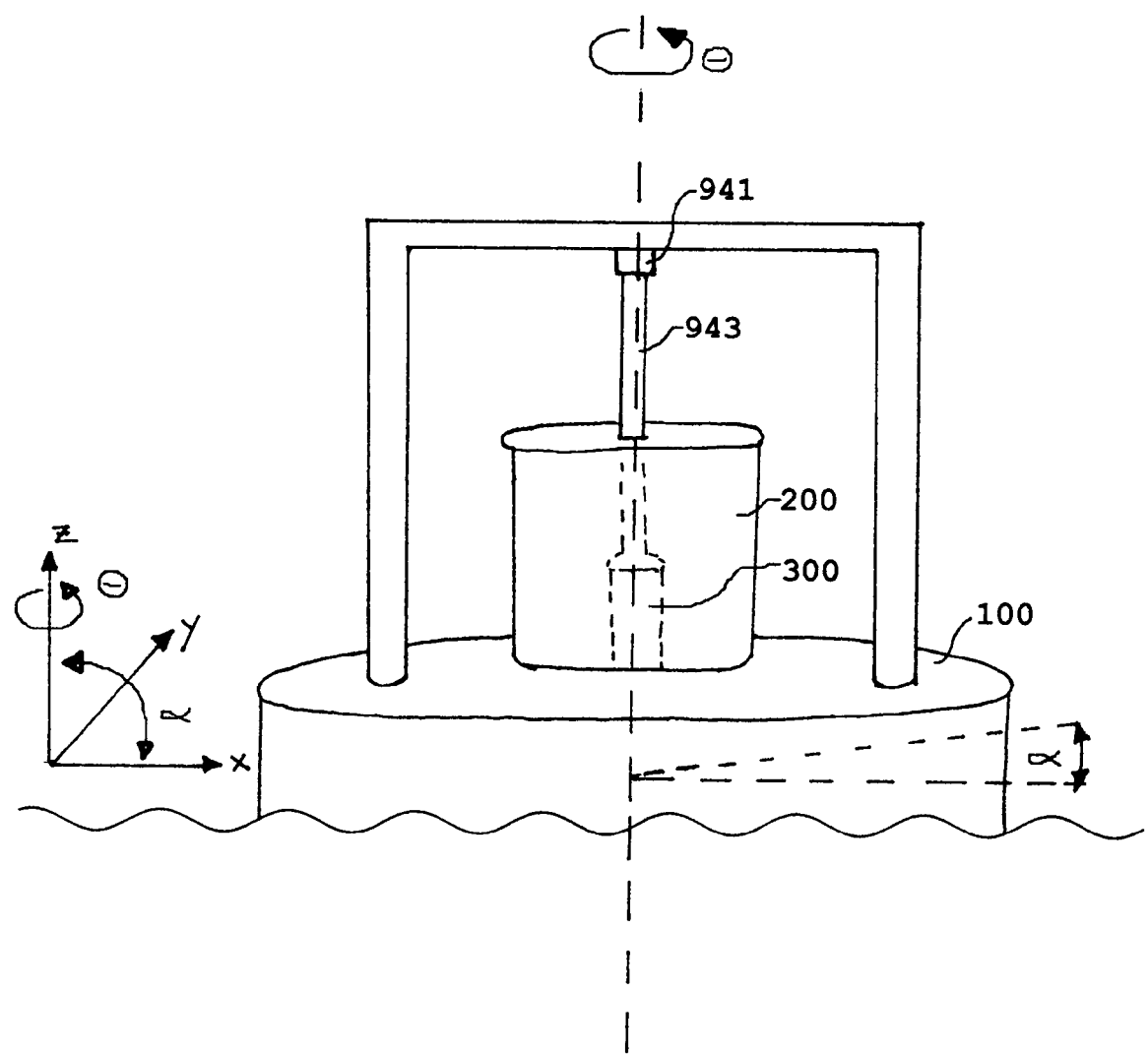
FIG. 12 is a sketch illustrating the different forces to which a float and spar may be subjected.

For purpose of operability and efficiency of the system it is desirable that the float move up and down smoothly along the spar. That is, it is desired that the motion be as much as possible only along the Z-axis. However, the motion and kinematics of waves and the associated water particles in the uncontrolled ocean environment is such that there are forces applied to the float in many different directions and angles. As shown in FIG. 12, there are forces applied to the float along the X, Y, and Z axes and along a rotational (theta) plane and in a 'racking" (alpha) direction tending to push one end of the float above or below the other end. The float and the PTO have to be protected from those forces which would tend to cause the float to rotate about the spar, which tend to push one side up relative to another (racking), and which would tend to push the float and spar against each other; i.e., from side loading or thrusts in the X and/or Y direction.

In order to allow these forces to be concentrated to drive the PTO more optimally and to protect the PTO and the mechanical equipment from the application of these diverse forces, a guidance/bearing system was developed. The system is a multi-point guidance or bearing system between the float and the spar which is designed to provide effective movement between the spar and float to have one degree of freedom (DOF).

Figure 13A:
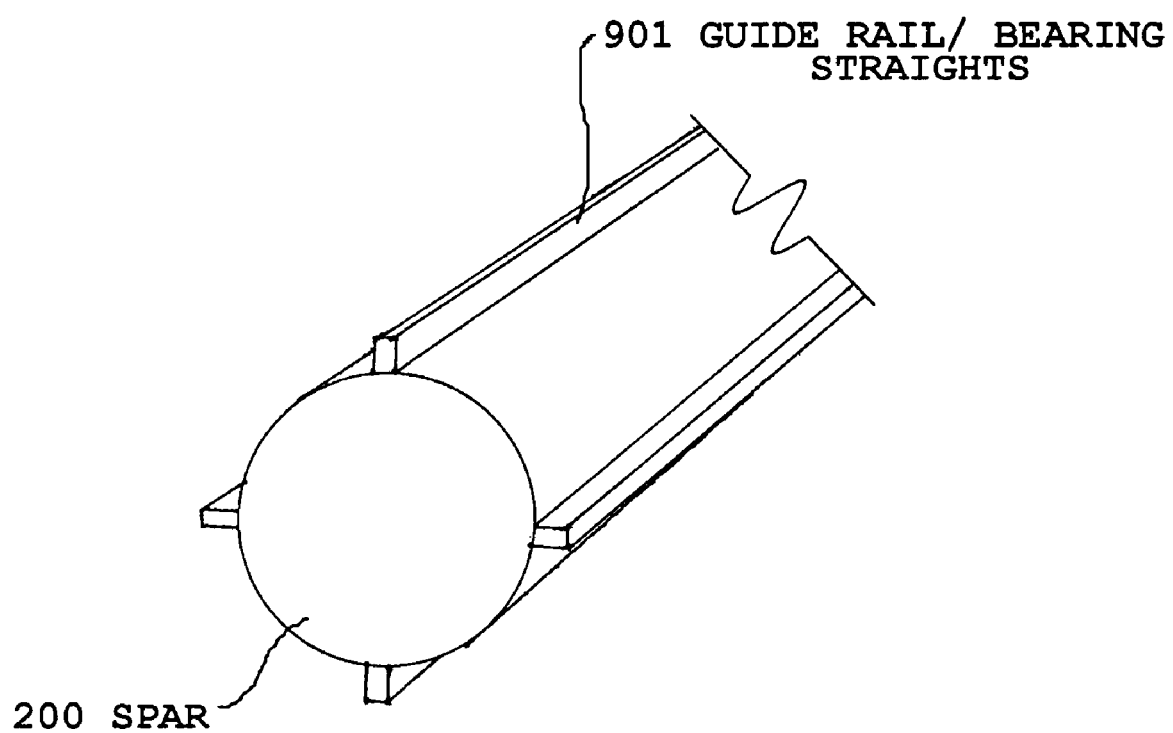
FIGS. 13a, 13b, and 13c are drawings illustrating the guidance/bearing structure of WECs embodying the invention.
Figure 13B:
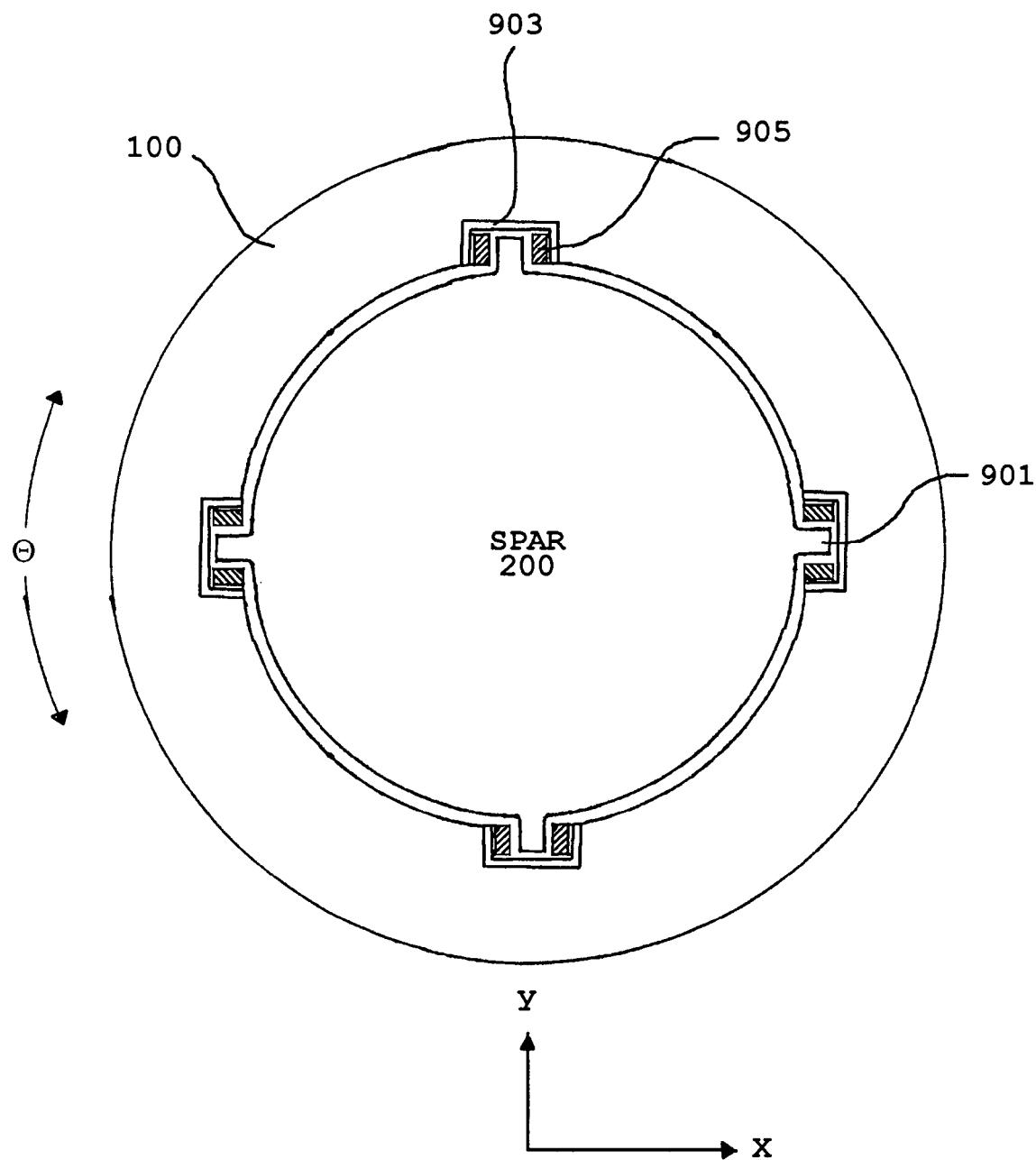
Figure 13C:
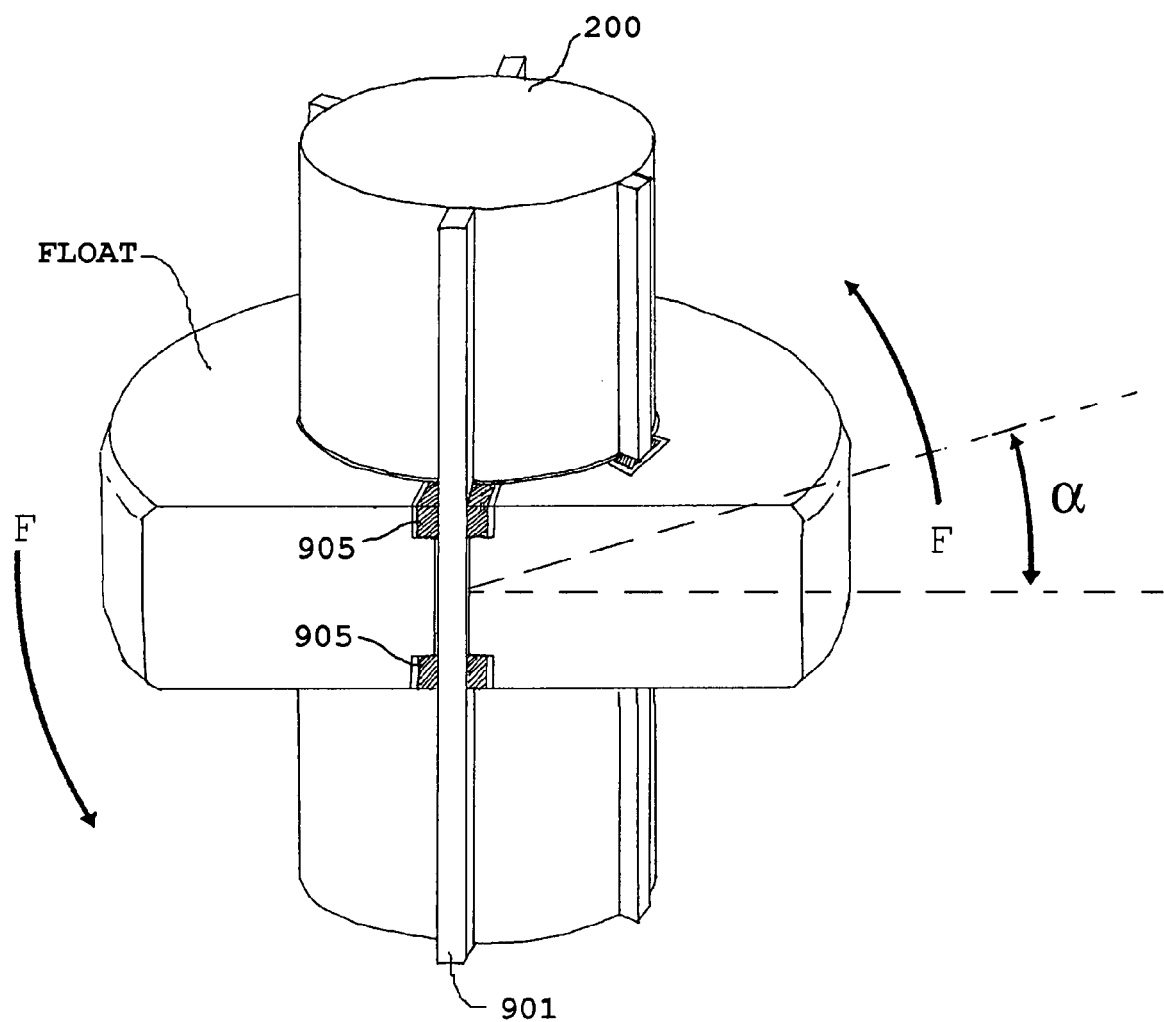

As shown in FIG. 13a the spar is formed with "bearing straights" (also referred to as rails or races) 901 (also identified in FIGS. 2 and 3) which run along and parallel to the length of the spar defining the up-down path of travel of the float relative to the spar. FIG. 13b is a top view of the cross-section of the spar and float and shows a spar 200 with 4 guide rails 901 extending within 4 cut out sections 903 formed within the interior wall of the float 100. Bearing pads 905 are attached to the walls of the cut-outs 903 to facilitate movement along the bearing rails 901 to the desired one degree of freedom. FIG. 13c illustrates that the bearing pads 905 also function to aid in resolving racking motion. Thus, the pads and bearing housing resist racking and rotation of the float as well as the thrusting in the X and Y direction.

The bearing straights 901 may be pipes or tubes or any suitable rails extending from the spar suitable for insertion into channels formed in the float. Alternatively, channels can be formed within the outer periphery of the spar and rails formed along the interior wall of the float to fit into the channels of the spar.

The bearing pads 905 may be mounted to the float (or spar) in either a solid or floating arrangement, or pre-set by a spring like device with or without a gap. The pads are of suitable material for marine use.

The guidance and bearing system limits motion in all directions except for the desired movement along the Z axis (up-down motion of the float relative to the spar). In the embodiments shown in FIGS. 2, 3, 4, 5 and 6A, the forces resulting from the movement of the float are translated via a truss/bridge to the PTO 300.

Figure 14:
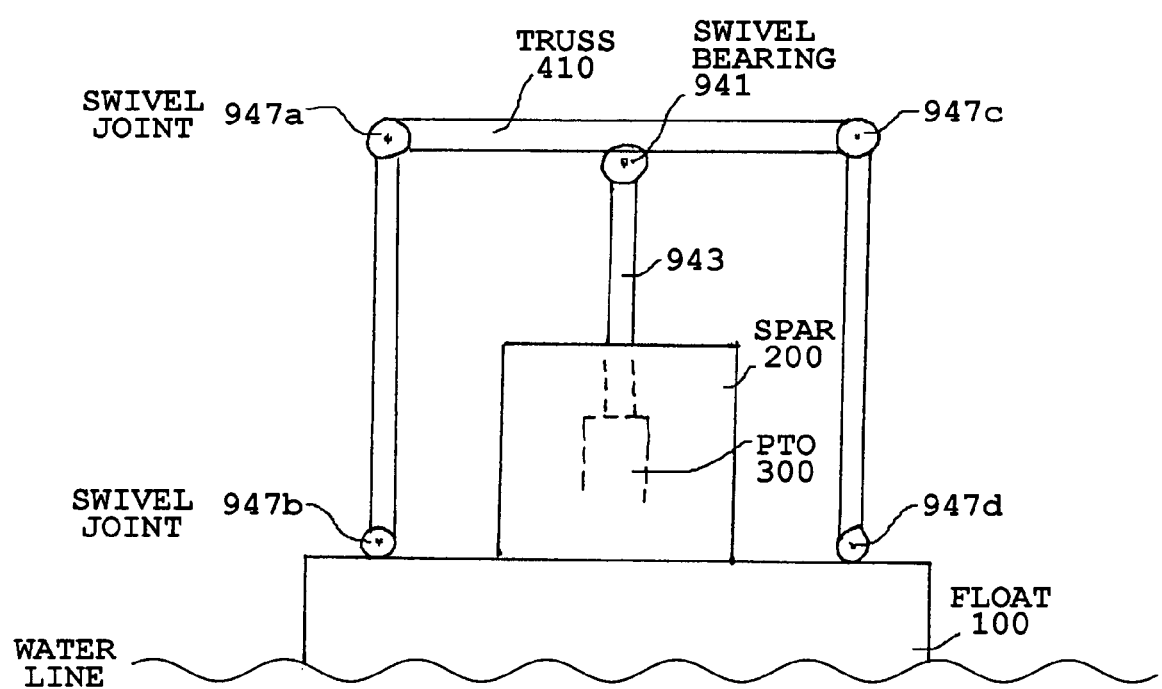
FIG. 14 is a drawing illustrating the bridge/truss structure for translating the movement of a float to a PTO located within a spar.

As shown in FIG. 14, a swivel bearing 941 attached to the truss/bridge 410 may be connected via a connecting element 943 to the PTO 300 to provide the forces to produce the desired conversion to a pre-selected form of energy (e.g., electrical or mechanical). The swivel bearing 941 between the truss and the PTO protects the PTO system from side loads or torsional loads within the tolerance of the guidance system. In addition, the arms and legs of the various structural members of the truss 410 may be interconnected via swivel joints 947 (a, b, c, d) to compensate for the different undesirable forces to which the system may be subjected. As shown in some figures, the truss 410 may be a bridge extending up from the float with 2, 3 or more legs.

Figure 15A:
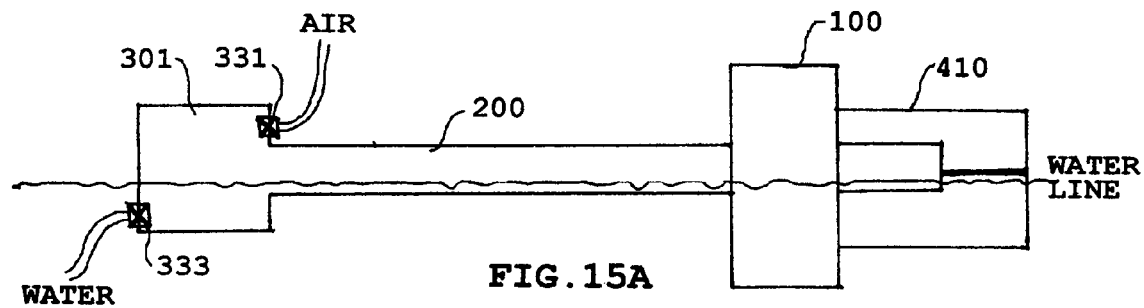
FIGS. 15A and 15B are highly simplified drawings, respectively illustrating placing a WEC in a horizontal position or in a vertical position by using buoyancy chambers.
Figure 15B:
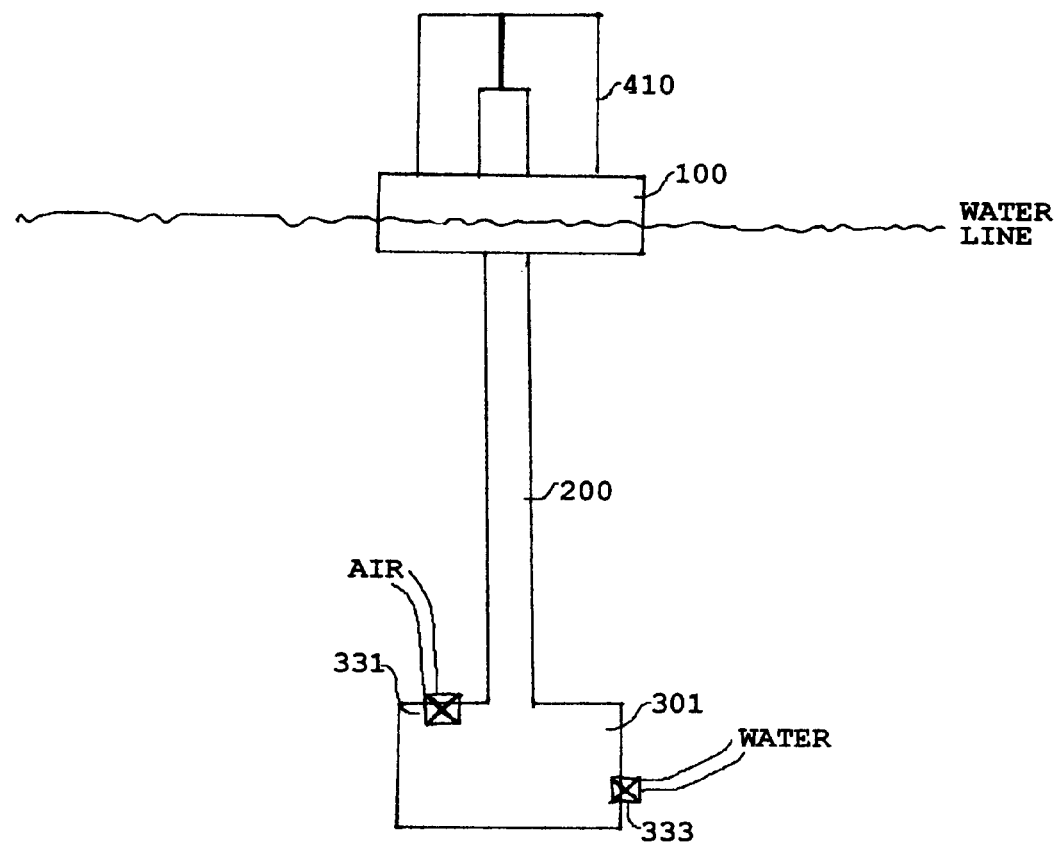

FIGS. 15A and 15 B are highly simplified diagrams illustrating that the spar 200 and float 100 may be placed in a horizontal or vertical position by means of one, or more, buoyancy/ballast chamber 301 attached to the bottom (or along) spar 200 by selectively filling the buoyancy chamber with a gas (e.g., air) or some substance (e.g., a liquid such as water) via valve elements 331 and 333. The buoyancy chambers may be of the type discussed above, or specifically formed for this particular purpose. By way of example, when towing a WEC to a selected site, the buoyancy chamber(s) 301 would be filled with a gas via a valve system (e.g., 331). Once the WEC is at a desired site, the gas may be evacuated and a liquid (e.g., water) is used to fill the chamber(s) 301 via a valve system 333. The amount of gas/liquid in the chamber(s) 301 could be adjusted via control system (not shown) when the WEC is on site to provide the desired buoyancy for the spar system.

What is claimed is:

1. A wave energy converter (WEC) comprising: a float intended to lie along the surface of a body of water and designed to move in-phase with the waves present in the body of water; a spar intended to extend vertically, generally perpendicular to the float and the surface of the body of water, said spar extending below the surface of the body of water and intended to move vertically up and down generally out-of-phase with the waves; a power take off device (PTO), connected between the spar and the float, responsive to their relative motion to convert their relative motion to useful energy; and a heave plate centrally connected to a submerged portion of the spar, said heave plate extending in a plane perpendicular to the spar, and at least one of rods and wires connected between the outer periphery of the heave plate and the spar for ensuring a structurally firm connection between the heave plate and the spar and that the plate moves uniformly up and down with the spar for effectively adding mass to the spar as the spar tends to move up and down and causing the spar to move generally out-of-phase relative to the float.

2. A WEC as claimed in claim 1, wherein the spar has an upper portion and a lower portion, wherein the float moves up and down along the upper portion of the spar, and wherein the heave plate is attached via at least one of rods and wires to a region along the spar; the region on the spar along which said rods and wires are connected being made sufficiently long to increase the structural strength and reduce any movement between the heave plate and the spar.

3. A WEC as claimed in claim 2, wherein the upper and lower portion of the spar are formed separately and are interconnected via a flexible coupling in order to reduce the magnitude of the forces between the heave, damping, plate and the upper portion of the spar translated through the joint.

4. A WEC as claimed in claim 3, wherein the at least one of the rods and wires are connected to the spar in a region above the flexible coupling.

5. A WEC as claimed in claim 1, wherein the at least one of said rods and wires are selectively placed in tension or compression in order to minimize the translated force between the heave plate and the spar.

6. A WEC as claimed in claim 1, wherein more than one heave plate is attached to the spar.

7. A WEC as claimed in claim 1, wherein a mechanical structure translates the motion of the float to the PTO for causing the PTO to respond to the relative movement between the float and spar.

8. A WEC as claimed in claim 7, wherein the mechanical structure coupling the float to the PTO includes a flexible coupling such that misalignment between the float and spar is compensated through the flexible coupling.

9. A WEC as claimed in claim 7, wherein the mechanical structure includes a truss section for enabling an electrical connection to be made to the PTO above the water level.

10. A WEC as claimed in claim 9, wherein the PTO has a power output port and wherein an electrical cable connection is made to the power output port of the PTO above the water line; and wherein said cable connection is then now run down along the WEC to the ocean floor and then to shore for grid connection.

11. A WEC as claimed in claim 2, wherein the upper portion of the spar extends above the float and wherein the PTO is located along the spar above the water line.

12. A WEC as claimed in claim 1, further including rails and channels formed along the inner wall of the float and the outer wall of the spar for limiting movement between the float and spar to the desired up and down direction and inhibiting rotational motion between the float and spar.

13. A WEC as claimed in claim 12 further including pads positioned along the channels to enable up and down relative travel between the spar and float with reduced racking, sticking and cocking.

14. A WEC as claimed in claim 2, wherein the surface area of the heave plate is greater than the surface area of the float.

15. A WEC as claimed in claim 2, wherein the float is annular with a central vertical opening, and wherein the upper portion of the spar extends vertically through the central opening of the float, and wherein the surface area of the float is greater than the cross-sectional area of the spar; and wherein the surface area of the heave plate attached to the submerged portion of the spar is greater than the surface area of the float.

16. A WEC as claimed in claim 2, wherein the cross sectional area of the upper portion of the spar in the region where the spar crosses the water line is less than the cross sectional area of the lower portion of the spar.

17. A WEC as claimed in claim 1, further including a buoyancy chamber attached to the WEC which, when filled with a gas, enables the WEC to be positioned in a horizontal direction and which, when filled with water positions the WEC in a vertical direction.

18. A WEC as claimed in claim 17, wherein the buoyancy chamber is one of the following: part of the heave plate, a separate structure above or below the heave plate connected to the spar.

19. A WEC as claimed in claim 1, further including a buoyancy chamber into which air (or other gas), may be pumped to vary the buoyancy of the WEC.

20. A WEC as claimed in claim 1, further including a buoyancy chamber which can be selectively flooded and emptied to control the stability of the WEC so that it has a generally horizontal orientation for tow-out, and a generally vertical orientation for deployment.

21. A WEC as claimed in claim 1, further including a buoyancy chamber which can be selectively filled and emptied to control and modify the natural buoyancy trim of the spar, when the WEC is deployed.

22. A WEC as claimed in claim 1, wherein the WEC is formed in different sections which are each easily transportable and which may be assembled by bolting and welding at a final assembly location.

23. A WEC as claimed in claim 1, wherein the heave plate includes a lip formed around its outer periphery for adding dynamic mass to the spar when it moves up and down.

24. A WEC as claimed in claim 1, wherein the float is formed in different sections which are each easily transportable and which may be assembled by bolting and welding at a final assembly location.

25. A WEC as claimed in claim 1, wherein the spar is formed in different sections which are each easily transportable and which may be assembled by bolting and welding at a final assembly location.

26. A WEC as claimed in claim 1, wherein the heave plate is formed in different sections which are each easily transportable and which may be assembled by bolting and welding at a final assembly location.

27. A WEC as claimed in claim 1, wherein an access hatch is present in order to enable access to the internal components of the WEC to enable maintenance and repairs.

28. A wave energy converter (WEC) comprising:
a float intended to lie along the surface of a body of water and designed to move in-phase with the waves present in the body of water;
a spar intended to extend vertically, generally perpendicular to the float and the surface of the body of water, said spar extending below the surface of the body of water and intended to move vertically up and down out-of-phase with the waves;
a power take off device (PTO), connected between the spar and the float, responsive to their relative motion to convert their relative motion to useful energy; wherein the spar has an outer wall facing the inner wall of the float; and means for limiting the motion between the float and spar to an up-down motion including at least two rails formed along one of the outer wall of the spar and the inner wall of the float; and including at least two corresponding channels formed along the other one of the outer wall of the spar and the inner wall of the float, wherein each rail fits within a corresponding one of the channels, whereby up down motion is permitted while rotational motion is inhibited; and
a heave plate centrally connected to a submerged portion of the spar, said heave plate extending in a plane perpendicular to the spar, and at least one of rods and wires connected between the outer periphery of the heave plate and the spar for ensuring a structurally rigid connection between the heave plate and the spar such that the plate moves uniformly up and down with the spar for effectively adding mass to the spar as the spar tends to move up and down.

29. A wave energy converter (WEC) as claimed in claim 28 wherein pads are disposed along the channels to enable smooth movement without racking or cocking.

30. A WEC as claimed in claim 29, wherein the PTO is connected to the float via a bridging structure extending from the float to translate the motion of the float to the PTO.

31. A WEC as claimed in claim 30 wherein the bridging structure includes swivel joints for protecting the PTO from excessive movements of the float.

32. A wave energy converter (WEC) comprising:
a float intended to lie along the surface of a body of water and designed to move in-phase with the waves present in the body of water;
a spar intended to extend vertically, generally perpendicular to the float and the surface of the body of water, said spar extending below the surface of the body of water and intended to move vertically up and down generally out-of-phase with the waves;
a heave plate centrally connected to a submerged portion of the spar, said heave plate extending in a plane perpendicular to the spar, and means securely and firmly connecting the heave plate and the spar for ensuring that the heave plate moves uniformly up and down with the spar for effectively adding mass to the spar as the spar tends to move up and down:

a power take off device (PTO), connected between the spar and the float, responsive to their relative motion to convert their relative motion to useful energy; and a buoyancy chamber connected to the spar including means for selectively filling the chamber with a gas for enabling the spar to be positioned in a horizontal direction and for selectively filling the chamber with a liquid for enabling the spar to be positioned in a vertical direction.

* * * * *